May 4, 1943. C. H. WHITE 2,318,275

DISK HARROW

Filed April 25, 1941

INVENTOR
CHARLES H. WHITE
BY
ATTORNEYS

Patented May 4, 1943

2,318,275

UNITED STATES PATENT OFFICE 2,318,275

DISK HARROW

Charles H. White, Moline, Ill., assignor to Deere & Company, Moline, Ill., a corporation of Illinois Application April 25, 1941, Serial No. 390,319

11 Claims. (Cl. 55—81)

This invention relates to agricultural implements and the like, and is more particularly concerned with hitch devices for disk harrows and other ground working tools.

The object and general nature of this invention is the provision of an improved gang angling control for disk harrows and the like. Disk harrows of the type shown in my prior Patent, No. 2,264,783, dated December 2, 1941, are provided with a central telescopic drawbar which, at its rear end, is pivotally connected with the inner ends of two axially aligned disk gangs and which carries a drawbar slide and latch box that is connected by draft links or side bars to the outer ends of the disk gangs. Normally, the tractor or other source of draft is hitched to the front section of the drawbar. The latter has a plurality of slots with which latch mechanism on the latch box cooperates, and by properly operating the latch mechanism and driving the tractor forwardly or backwardly, the gangs may be angled or straightened by power, as disclosed in said prior patent.

The principal feature of this invention is the provision of improved latch mechanism for tractor controlled disk harrows. More specifically, it is a feature of this invention to provide a latch box for a disk harrow, in which two drawbar engaging plungers are controlled by one latch lever, whereby a finer degree of adjustment of the angle of the associated disk gang is secured but without requiring an excessive number of slots or reducing the size or strength of the parts.

These and other objects and advantages of the present invention will be apparent to those skilled in the art after a consideration of the following detailed description of the preferred embodiment illustrated in the accompanying drawing, in which.

Figure 1:
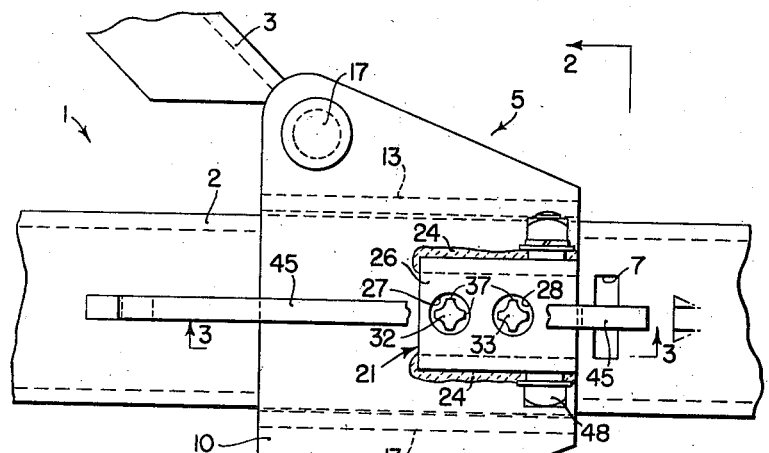
Figure 1 is a plan view of the forward portion of the hitch device of a disk harrow, embodying the double plunger gang angling control latch, constructed according to the principles of the present invention.
Figure 2:
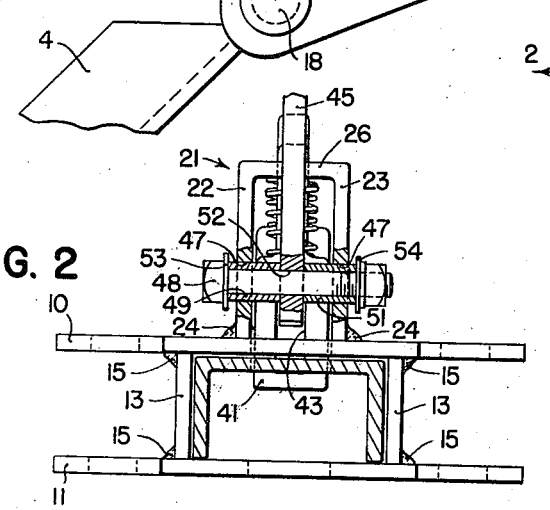
Figure 2 is a view taken generally along the line 2—2 of Figure 1.

The disk harrow hitch is indicated in its entirety by the reference numeral 1 and includes a drawbar 2 preferably of channel section, a pair of side bars 3 and 4, and latch mechanism 5 controlling the position of the side bars 3 and 4 relative to the drawbar 2 which controls the angling of the disk gangs. The drawbar 2 is provided with a plurality of slots 7 adjacent the front end.

The latch mechanism 5 includes a drawbar slide and latch box which comprises upper and lower plates 10 and 11 shaped as shown in Figure 1 and spaced apart by a pair of side plates 13 which are welded, as at 15, or otherwise secured to the plates 10 and 11. The arrangement is such that the drawbar 2 is disposed between the upper and lower plates and the side plates so as to be capable of sliding relative thereto. The upper and lower plates 10 and 11 are apertured at their rear corners to receive pivots 17 and 18 by which the side bars 3 and 4 are pivotally connected to the plates 10 and 11.

The upper plate 10 carries an inverted U-shaped bracket or latch box 21, the sides 22 and 23 of which are welded, as at 24, to the upper plate 10. The upper end 26 of the bracket 21 is apertured, as at 27 and 28, to receive the upper ends 32 and 33 of a pair of latch plungers 34 and 35. The upper ends 32 and 33 are fluted, forming fins as at 37, and fit loosely within the openings 27 and 28 to facilitate sliding movement of the plungers in the bracket 21.

The plungers 34 and 35 are of particular formation. Preferably they are alike and each is offset centrally, as at 39, below which offset each plunger is flattened, as at 41. The flat lower portions 41 are disposed closely adjacent one another (Figure 3) and the upper plate 10 has an opening 42 into which both lower ends of the plungers 34 and 35 extend. The lower end 41 of each plunger has an elongated slot 43.

The plungers 34 and 35 are controlled by a trip lever 45 that is pivotally carried by the bracket 21. To this end the sides 22 and 23 of the latter are apertured, as at 47, to receive a bolt 48 and a pair of hardened bushings 49 and 51 on the bolt. The lower end of the trip lever 45 is apertured, as at 52, and is mounted on the bolt 48 between the two bushings 49 and 51. Washers 53 and 54 are mounted on the bolt 48 at the outer ends of the bushings, and a nut 55 when tightened holds the parts firmly together.

Figure 3:
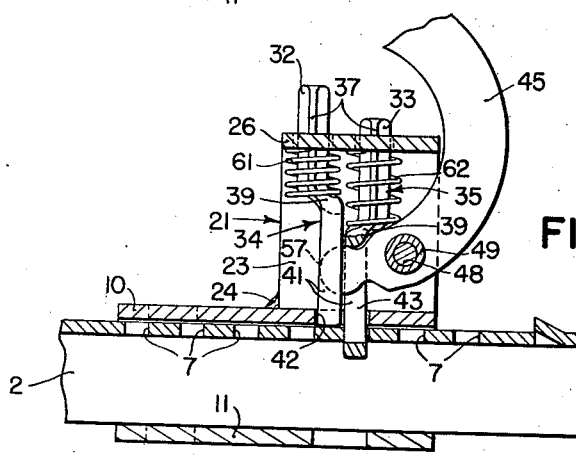
Figure 3 is a sectional view taken generally along the line 3—3 of Figure 1.

The lower end of the trip lever 45 is provided with a rounded end 57, the edges of which are circular about a center that lies in the plane between the contiguous lower parts 41 of the two latch plungers 34 and 35. Springs 61 and 62 are disposed about the upper fluted ends of the latch plungers between the upper end 26 of the bracket 21 and the offset sections 39. The amount of offset is sufficient to accommodate the springs while permitting the two lower portions 41 to lie substantially against one another. The springs urge the latch plungers downwardly, and when one is over a notch 7 in the draft bar 2 it moves downwardly until the upper edge of the slot 43 rests on the upper rounded edge 57, as best shown in Figure 3.

In the assembly of this device, the plates 10, 11 and 13, and the latch box 21 are welded together. Next the plungers 34 and 35 are placed in position in the latch box or bracket 21 with the springs 61 and 62 about the upper portions 32 and 33, and then the trip lever 45 is placed with the rounded end 57 in the slots 43. Lastly the bolt 48 and associated bushings are inserted through the holes 47 and the hole 53 in the trip lever 45. This secures all parts in proper position.

While I have shown and described above the preferred structure in which the principles of the present invention has been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a disk harrow or the like having a recessed drawbar, a latch box comprising a pair of upper and lower plates spaced to receive said drawbar therebetween and the upper plate having a pair of laterally spaced apart upstanding sections fixed thereto and an opening between said sections, a pair of detent plungers mounted for vertical movement between said sections with both disposed in the opening in the upper plate, the recesses in said drawbar being spaced so that only one of the detent plungers may engage in a recess at any one time, and a trip lever pivoted on said sections and engageable with both of said detent plungers for disengaging either from said drawbar.

2. Latch mechanism for a part having a plurality of spaced recesses therein, comprising an apertured plate slidable with respect to said part, a U-shaped bracket having its ends fixed to said plate on opposite sides of said opening, the intermediate portion of said bracket having a pair of spaced openings therein, a pair of detent plungers mounted with their lower ends adjacent one another and both disposed in said opening in said plate, the upper ends of said plungers being offset away from one another and extending in guided relation through the openings in the intermediate portion of said bracket, and means engageable with the lower portions of said detent plungers for holding them out of engagement with said recessed part.

3. Latch mechanism for a part having a plurality of spaced recesses therein, comprising an apertured plate slidable with respect to said part, a U-shaped bracket having its ends fixed to said plate on opposite sides of said opening, the intermediate portion of said bracket having a pair of spaced openings therein, a pair of detent plungers mounted with their lower ends adjacent one another and both disposed in said opening in said plate, the upper ends of said plungers being offset away from one another and extending in guided relation through the openings in the intermediate portion of said bracket, and a trip lever pivotally mounted on said bracket and having an end engageable with both of said detent plungers for holding both out of engagement with said recessed part.

4. Latch mechanism comprising a pair of detents, each having a substantially flat section with an opening extending therethrough, means mounting said detents for relative movement with the flat sections substantially against one another and with the openings in said flat sections in substantial registry, and a single lever mounted for movement about a pivot axis at one side of said flat sections and having one end extending substantially perpendicular to said flat sections and into the registering openings in the latter so as to engage both of said detents.

5. Latch mechanism comprising a pair of detents having flat sections, movably disposed adjacent one another, said flat sections having registering slots therein, and a single lever having one end disposed within both said slots and formed to engage either or both of said detents.

6. Latch mechanism comprising a pair of detents, spaced means engageable with the end portions of said detents for guiding their relative movement, said detents having flat slotted sections which are disposed substantially against one another, and means mounted between said spaced guiding means and disposed in the slots of said detents for moving one or the other into retracted position and holding both in said retracted position.

7. In a latch mechanism, a pair of detent members having registering slots therein, the slotted portions being disposed substantially in contact with one another, and a pivoted controlling member having an end disposed within said slots, said end being curved about a center that lies substantially in the plane between said slotted detent portions.

8. In a latch mechanism, a pair of detents, each having an offset section at one end thereof, means supporting said detents for relative movement with said offset ends disposed away from one another and with the other ends of said detents disposed closely adjacent one another, and a spring disposed about each offset section, each spring reacting at one end against the detent at the point where the offset section joins the other portion thereof, the amount of offset being sufficient to accommodate the disposition of said springs about the offset sections.

9. The invention set forth in claim 8, further characterized by said spring receiving offset sections having elongated fins.

10. Latch mechanism comprising a pair of plungers, means supporting said plungers for relative movement, said plungers having offset sections spaced from one another, a spring encircling each offset section and reacting at one end against the portion of the plunger where the offset section joins the other part of the plunger and at the other end against said supporting means, and means engageable with said plungers for moving one or the other into retracted position and holding both in said retracted position.

11. In a latch mechanism, a pair of detent members having registering slots therein, the slotted portions being disposed substantially in contact with one another and with said slots in substantial registry, and a controlling member pivoted adjacent one detent member and having an end extending through the slot in said one detent member and into the slot in the other detent member so as to engage and operate both of said detent members.

CHARLES H. WHITE.